Patented Dec. 25, 1934

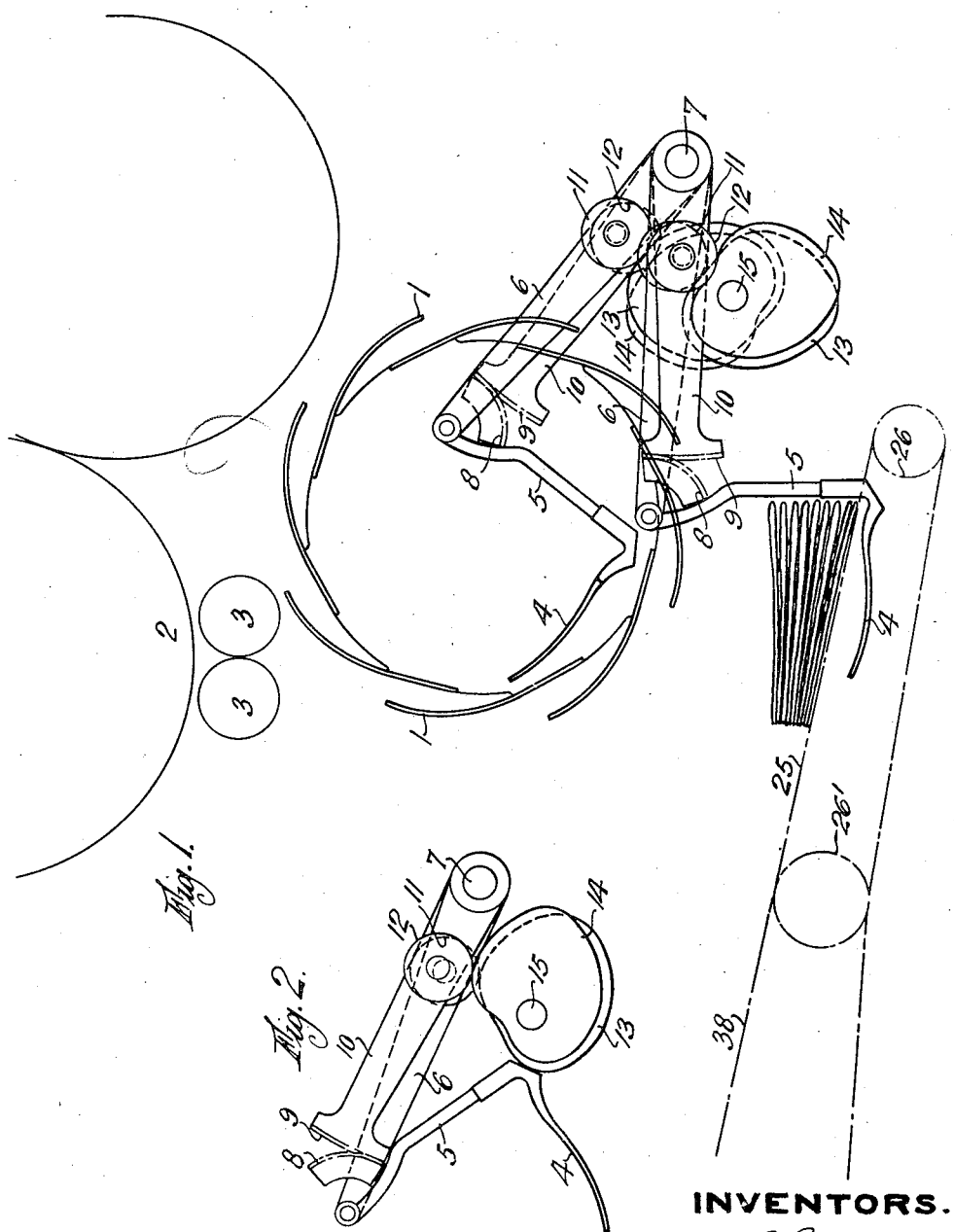

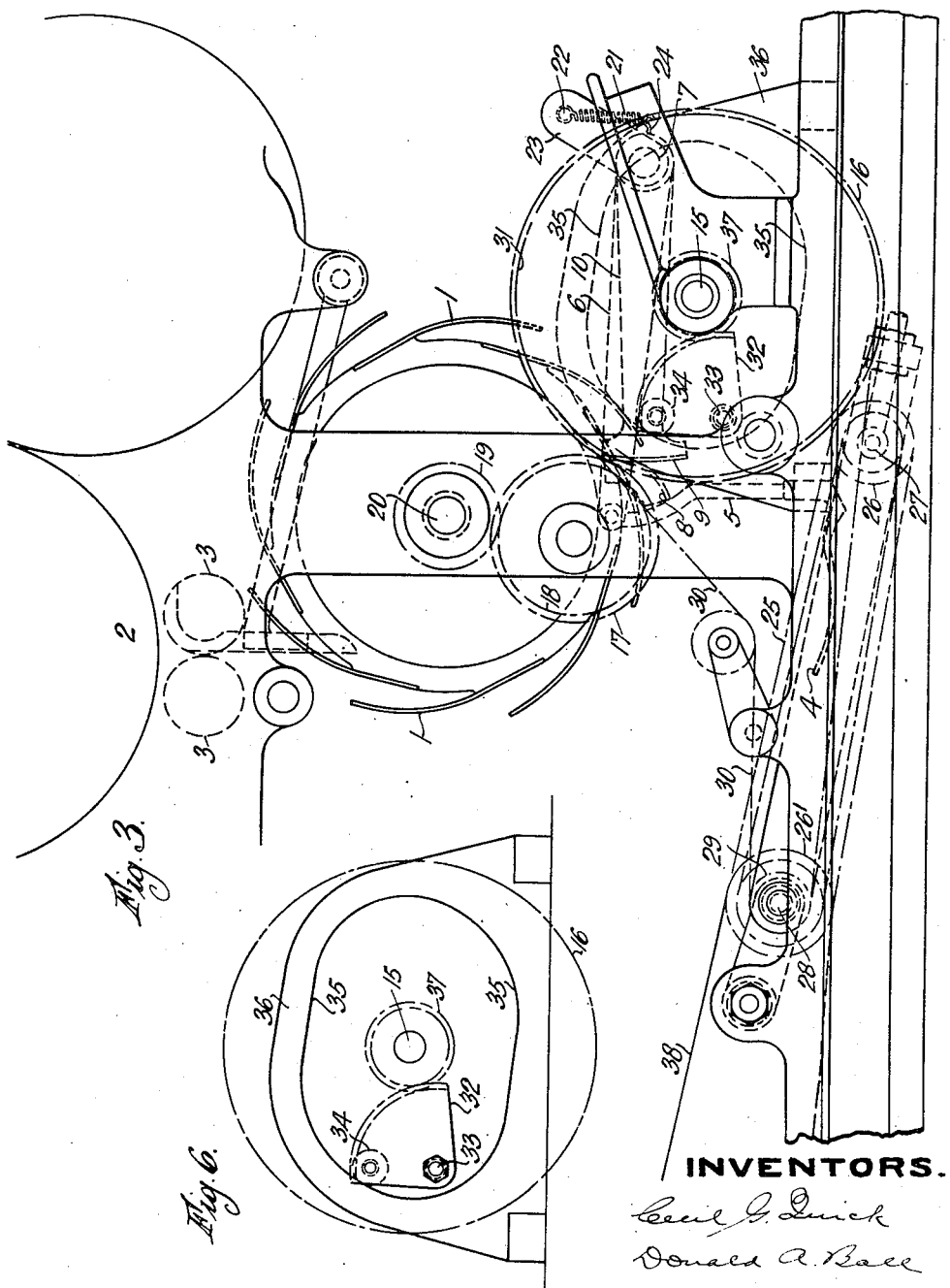

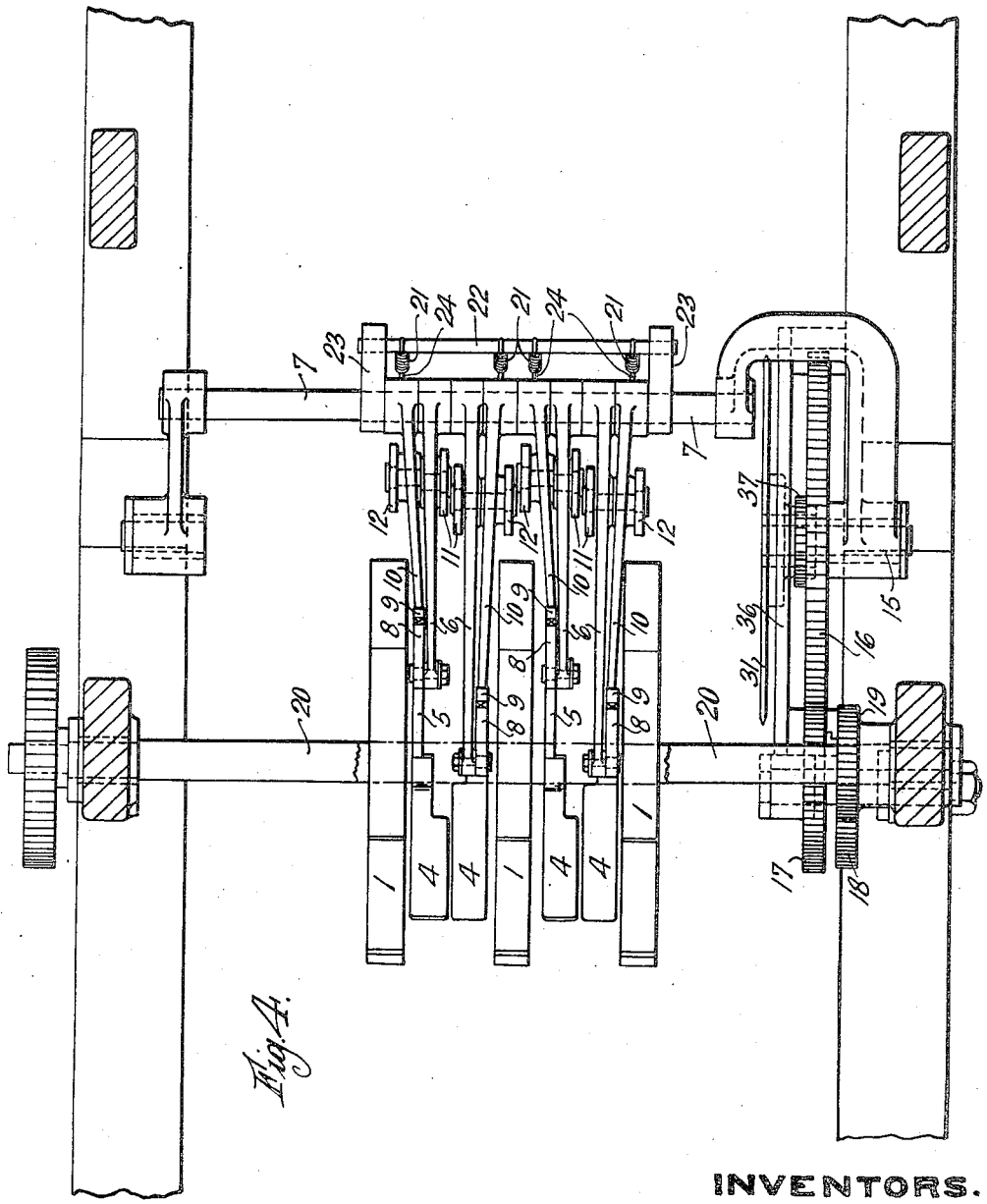

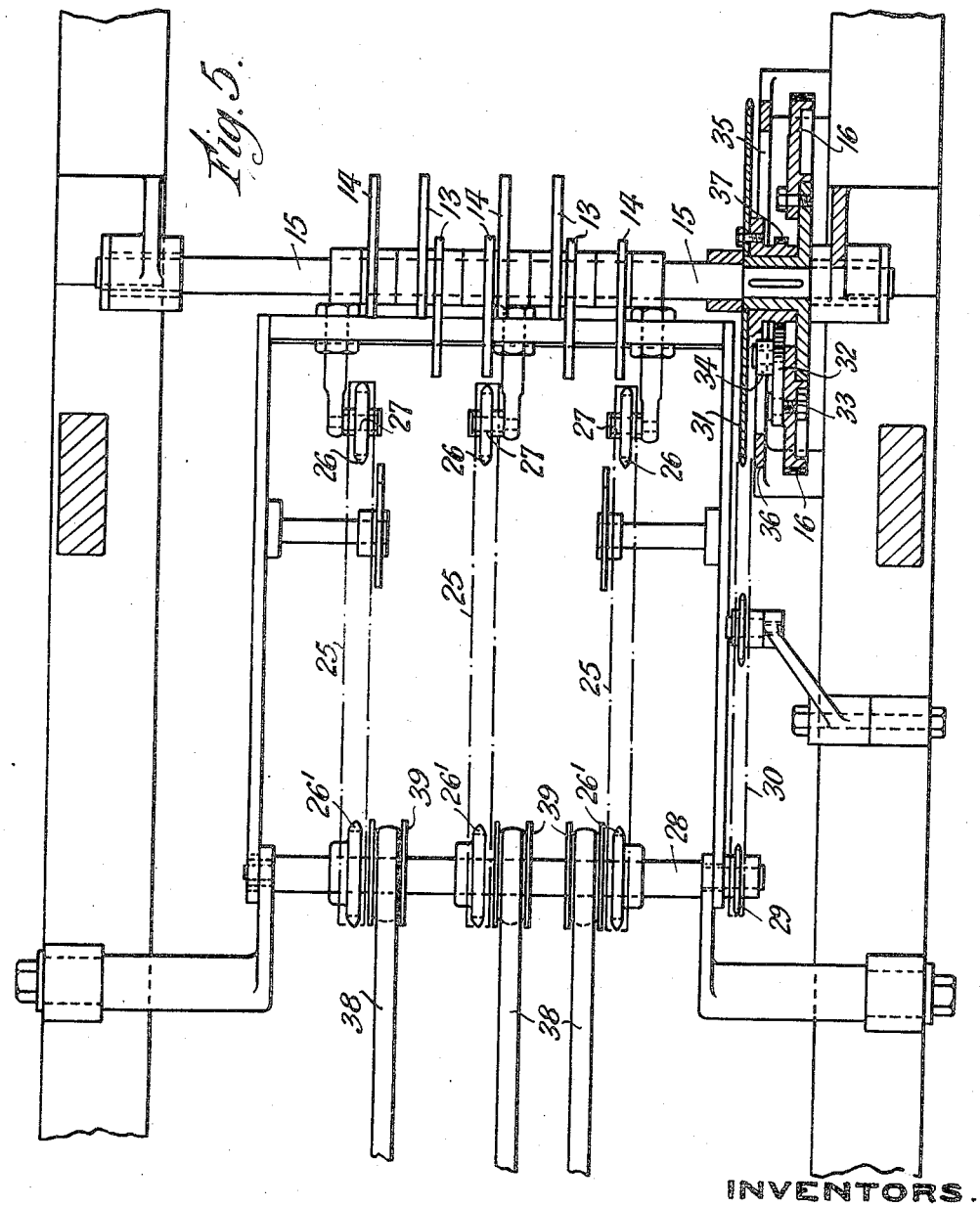

1,985,547

UNITED STATES PATENT OFFICE 1,985,547

DELIVERY MECHANISM

Cecil George Quick, Donald Arthur Ball, and William Arnold Whitehead, London, England, assignors to Irving Trust Company, temporary trustee for R. Hoe & Co., Inc., New York, N. Y., a corporation of New York Application May 10, 1933, Serial No. 670,278 In Great Britain May 11, 1932

22 Claims. (Cl. 93—93)

This invention relates to improvements in delivery mechanism for use for example with printing machines and is more particularly concerned with the delivery mechanism employed for delivering what are commonly referred to as magazine products although it will be understood that the invention is not limited thereto.

Heretofore in such delivery mechanism there has commonly been employed a rotatable fly which lays copies on an endless travelling belt so that the copies are spread out on the belt. Counting of the copies has been effected by a kicker which periodically causes one copy to be partly displaced from the remaining copies the sucessive displaced copies indicating between them the required "count". The copies are then taken from the conveyor either direct or by a second conveyor which conveys them to the publishing room, but in either case the counted copies have to be knocked up into bundles by an operator who grasps counted bundles of spread-out copies between two count copies. Such an arrangement possesses several disadvantages, firstly, with the increasing rate of production of printing machines it becomes very difficult for operators to remove the bundles of copies and to knock them up at the rate at which the machine is capable of delivering the copies. Secondly, the ejector ejects the "count" copies not through a constant distance but through a distance which varies with the speed at which the machine is running, that is to say, when the machine is running slowly the count copies will be ejected a smaller distance than when the machine is running rapidly.

The main object of the present invention is to provide a delivery mechanism in which the kicker mechanism is not required and in which the copies are delivered in counted bundles.

In carrying out the present invention there is provided a delivery bucket or tray hereinafter referred to as a bucket which at the commencement of the cycle of operations is in receiving position with respect to a fly, is then moved slowly away from the fly as copies are successively delivered into the bucket, and into position to deposit its contents on an endless conveyor and is returned to its original position to recommence a further cycle of operation. Two or more such buckets are provided one moving into receiving position with respect to the fly at the moment that the other (or another) lays its copies on the conveyor belt, and the buckets each have a return movement such that the one which is returning to its original position is cleared from the path of that one which is moving on the delivering part of its cycle whereafter the returning bucket is caused to move into its initial position at the moment that the other has received the required number of copies and laid them on the conveyor.

The invention is illustrated in the accompanying drawings in which Figure 1 is a diagrammatic side elevation and Figure 2 a detail view showing one of the receiving devices in an alternative position. Figure 3 is a side elevation showing a practical application of the invention, Figure 4 a plan view of Figure 3, Figure 5 a plan view partly in section and similar to Figure 4 with certain parts removed and Figure 6 a detail elevation.

1 is a delivery fly of usual form and into which products are delivered in known manner from a folding cylinder 2 and folding-off rolls 3, the fly being rotated in any convenient manner. The fly is arranged to lay products in two buckets each of similar construction and one of which will now be described.

A bucket is formed in two parts each consisting of a tray-like portion 4 carried by an L-shaped arm 5 pivotally mounted on an arm 6 pivotally carried by a cross shaft 7. The arm 5 is fast with a gear sector 8 which is in mesh with a sector 9 formed on an arm 10 also pivotally mounted on the shaft 7. The arms 6 and 10 are provided with followers in the form of rollers 11, 12 respectively which are in engagement with cams 13, 14 mounted on a cross shaft 15 rotated through gear wheels 16, 17, 18 and 19 from the fly shaft 20.

The rollers 11 and 12 are held against their cams by the weight of the assembly of the two part bucket and in the case of the rollers 12, springs 21 are provided which are connected at one end to a transverse bar 22 carried by brackets 23 secured to the shaft 7 and at the other end to projections 24 on each arm, the springs thus tending to rotate the arms in an anti-clockwise direction. It may be found, in certain cases, that the weight of the arms is sufficient to keep the rollers 12 against their cams and in such cases the springs 21 and their associated parts could be dispensed with.

It will be observed that the bucket sections are arranged to pass between the fly sections and the buckets are arranged to lay the copies on delivery belts or chains between which the bucket sections also pass to free themselves from the copies.

The delivery illustrated comprises chains 25 which pass around sprocket wheels 26, 26' on stub shafts 27 and a cross shaft 28 respectively; the shaft 28 is provided with a sprocket wheel 29 around which passes a second or driving chain 30 and this driving chain is driven in such a manner that the delivery chains are brought to rest while copies are being laid thereon by the buckets and are then moved to clear the laid copies and to present a fresh section for the next bundle of copies: this is effected by passing the driving chain 30 around a sprocket wheel 31 which is rotatably mounted on the shaft 15 and is driven from the gear wheel 16 through a device which alternately adds and subtracts a component of rotation to and from that due to the constant rotation of the gear wheel 16. The device comprises a gear sector 32 which is pivotally mounted on a stud 33 carried by the gear wheel 16 and is provided with a roller 34 controlled by a cam track 35 formed in a fixed plate 36, the sector being in mesh with a gear wheel 37 fast with the sprocket wheel 31. The cam track is so shaped that during one phase of the cycle of operation the rotation of the sector due to its partaking of the continuous rotation of the gear wheel 16 is cancelled by the movement imparted to the sector by the cam track 35 about the stud 33 thus resulting in no drive being transmitted to the gear wheel 37 and hence the delivery chains 25. In the next phase of the cycle, the movement imparted by the cam track to the sector about the stud is added to the rotation of the sector due to the rotation of the gear wheel 16 and thus the gear wheel 37 receives the added components of rotation which are imparted to the sprocket wheel 31 and hence the delivery chains 25.

The delivery chains convey the bundles of copies to a belt delivery consisting of belts 38 which pass around pulleys 39 which are fast on the shaft 28 and are consequently rotated by the intermittent rotation of the shaft due to the intermittent drive transmitted by the chains 25.

The arrangement is such that while one bucket is receiving copies, the other is returning to its original position the cams 13, 14 for the respective buckets being set on the shaft so as to be 180° out of phase. For each bucket and commencing from the moment at which a bucket commences to receive copies from the fly the cycle of operation is as follows; during the period of the cycle in which copies are laid by the fly in the bucket the arms 6, 10 of the bucket are caused to maintain the relative positions shown in Figure 1 but are lowered together away from the fly as copies are delivered to the bucket: this is effected by providing the corresponding cams 13, 14 with similar contours, the effective radius of the cams gradually decreasing to allow the arms to fall together; this operation continues until the required number of copies has been received by this bucket at which time the copies are stacked on the conveyor chains 25 which are now stationary. The rollers 11, 12 of the arms 6, 10 of the bucket now engage cam contours having dissimilar shape with the result that not only are the arms 6, 10 caused to commence their return movement towards receiving position, but also the arms 10 are caused to have a movement relatively to the arms 6; this action results through the intermeshing sector gears 8, 9, on the arms 5 carrying the bucket portions 4 rocking in an anti-clockwise direction into a position (shown in Figure 2) in which, during its upward movement, it will clear the second bucket: it will of course be understood that this second bucket has by this time been moved into receiving position (as shown in Figure 1) and is moving slowly downwards towards the chains which have been moved to clear the copies stacked thereon by the first bucket.

The rollers 11, 12 of the first bucket now engage parts of the cams 13, 14 which have similar contours such as to continue to raise the arms 6, 10 together i. e. without relative movement until, the contours of the cams again becoming dissimilar, the arms are again caused to have relative movement to return the bucket arms 5 to their original forward position (as shown in Figure 1). The second bucket has by this time received nearly all of the required number of copies and as the last required copy is delivered to that bucket, the cams 13, 14 of the first bucket allow this bucket to fall, with a comparatively quick motion into position to receive the next copy delivered by the fly whereafter the cycle is repeated.

It will be understood that each bucket operates through a similar cycle of operations, one bucket being in receiving position while the other is returning to receiving position.

It will be seen that the buckets deliver the copies in counted bundles and in a fashion in which they can easily be collected either by an operator stationed at the delivery or if desired in the publication room to which the bundles may be conveyed in any usual manner as by means of a series of buckets mounted on vertically moving conveyors which transport the bundles from the printing room to the publishing room.

It will also be seen that the arrangement according to the invention avoids the use of the kicker and the difficulties consequent upon the use thereof.

What we claim is:

1. In mechanism for use in delivering the products of a printing machine in bundles consisting of a predetermined number of products, the combination of a delivery fly, two delivery devices coactable with said fly, and means for operating the devices so that one device receives products passing in succession from the fly until the required number of products to constitute a bundle has been received and delivers the products while the other device returns from its delivery point and into position to receive products from the fly to constitute a second bundle.

2. In mechanism for use in delivering the products of a printing machine in bundles consisting of a predetermined number of products, the combination of a delivery fly, two delivery devices coactable with said fly, and means for so operating the devices that one device is moved slowly from a receiving point towards a delivery zone as the device receives products passing in succession from the fly while the other device is returned from the delivery zone and presented to receive products from the fly at the moment when the first device has received the required number to constitute a bundle and has delivered the bundle.

3. In mechanism for use in delivering the products of a printing machine in bundles consisting of a predetermined number of products, the combination of a delivery fly, two delivery devices coactable with said fly, and means causing the devices to follow looped paths having common points, the operating means of one device being in different phase relationship with respect to the operating means of the other device whereby one device is operated to receive products passing in succession from the fly until the required number of products to constitute a bundle has been received and to deliver the bundle to a delivery zone common to the two devices while the other device is operated to return from the delivery zone and into position to receive products from the said fly to constitute a succeeding bundle.

4. In mechanism for use in delivering the products of a printing machine in bundles consisting of a predetermined number of products, the combination of a delivery fly, two delivery devices coactable with said fly, means causing the devices to move in the same looped path but out of phase with respect to each other, one device being moved on one side of the path and towards a delivery zone as products passing in succession from the fly are received by the device while the other device is returned from the delivery zone and on the other side of the path towards a position for receiving products from the fly, and each device receiving products until the number required to constitute a bundle has been received whereupon the other device is moved into receiving position relatively to the fly.

5. In mechanism for use in delivering the products of a printing machine in bundles consisting of a predetermined number of products, the combination of a delivery fly, a pair of delivery devices coactable with said fly and each comprising receptacles for the products, articulated arms carrying the receptacles, and means for causing simultaneous and relative movement of and between the articulated arms, the means operating so that the arms of one device are actuated to present the associated receptacle to receive products from the fly and to move them towards a delivery point and to deliver the products when the required number to constitute a bundle is received while the arms of the other device are actuated to move the associated receptacle clear of the first receptacle and to return the receptacle from the delivery point and then to present the receptacle to receive products from the fly to constitute a succeeding bundle.

6. In mechanism for use in delivering the products of a printing machine in bundles consisting of a predetermined number of products, the combination of a pair of delivery devices each comprising a receptacle, an arm carrying the receptacle, a second arm to which the first arm is articulated, a third arm for rocking the first arm about the second arm, the pivotal points of the second arms of the two devices lying on co-axial axes, and cam means for rocking the second and third arms, the cams being such that the second and third arms of one device are operated together equally to enable the corresponding receptacle to receive copies and to move progressively towards a delivery zone while the second and third arms of the other device are caused to have relative movement in such manner that the corresponding receptacle is moved clear of the first receptacle and returned from the delivery zone whereupon these arms are caused to return to their original position to move the second receptacle into position in readiness to receive products to constitute a succeeding bundle.

7. In mechanism for use in delivering the products of a printing machine in bundles consisting of a predetermined number of products, the combination of a fly which feeds the copies, a pair of delivery devices each comprising a plurality of parts consisting of a receptacle, an arm carrying the receptacle, a second arm to which the first arm is articulated, a third arm for rocking the first arm about the second arm the parts being arranged to enter between the parts of the fly and the pivotal points of the second arms of the two devices lying on co-axial axes, and cam means for rocking the second and third arms, the cams being such that the second and third arms of one device are operated together equally to enable the corresponding receptacle parts to receive copies and to move progressively towards a delivery zone while the second and third arms of the other device are caused to have relative movement in such manner that the corresponding receptacle parts are moved clear of the first receptacle parts and returned from the delivery zone whereupon these arms are caused to return to their original position to move the second receptacle parts into position in readiness to receive products to constitute a succeeding bundle.

8. In mechanism for use in delivering the products of a printing machine in bundles consisting of a predetermined number of products, the combination of a pair of delivery devices each comprising a receptacle, an arm carrying the receptacle, a second arm to which the first arm is articulated, a third arm, gearing connecting the third and first arms whereby the third arm is adapted for rocking the first arm about the second arm, the pivotal points of the second arms of the two devices lying on co-axial axes, and cam means for rocking the second and third arms, the cams being such that the second and third arms of one device are operated together equally to enable the corresponding receptacle to receive copies and to move progressively towards a delivery zone while the second and third arms of the other device are caused to have relative movement in such manner that the corresponding receptacle is moved clear of the first receptacle and returned from the delivery zone whereupon these arms are caused to return to their original position to move the second receptacle into position in readiness to receive products to constitute a succeeding bundle.

9. In mechanism for use in delivering the products of a printing machine in bundles consisting of a predetermined number of products, the combination of a pair of delivery devices each comprising a receptacle, an arm carrying the receptacle, a second arm to which the first arm is articulated, a third arm for rocking the first arm about the second arm, the pivotal points of the second and third arms of the two devices lying on co-axial axes, and cam means for rocking the second and third arms, the cams being such that the second and third arms of one device are operated together equally to enable the corresponding receptacle to receive copies and to move progressively towards a delivery zone while the second and third arms of the other device are caused to have relative movement in such manner that the corresponding receptacle is moved clear of the first receptacle and returned from the delivery zone whereupon these arms are caused to return to their original position to move the second receptacle into position in readiness to receive products to constitute a succeeding bundle.

10. In mechanism for use in delivering the products of a printing machine in bundles consisting of a predetermined number of products, the combination of a pair of delivery devices each comprising a receptacle, an arm carrying the receptacle, a second arm to which the first arm is articulated, a third arm for rocking the first arm about the second arm, the pivotal points of the second arms of the two devices lying on co-axial axes, and cam means for rocking the second and third arms, a shaft on which all the cam means are mounted, means for driving the shaft, the cams being such that the second and third arms of one device are operated together equally to enable the corresponding receptacle to receive copies and to move progressively towards a delivery zone while the second and third arms of the other device are caused to have relative movement in such manner that the corresponding receptacle is moved clear of the first receptacle and returned from the delivery zone whereupon these arms are caused to return to their original position to move the second receptacle into position in readiness to receive products to constitute a succeeding bundle.

11. In mechanism for use in delivering the products of a printing machine in bundles consisting of a predetermined number of products, the combination of a delivery fly, two delivery devices, an endless conveyor to which the devices coactable with the said fly, are arranged to deliver products, means for so operating the devices that one device is moved slowly from a receiving point towards the conveyor as the device receives products from the fly passing in succession from the printing machine while the other device is returned from the conveyor and presented to receive products from the fly at the moment when the first device has received the required number to constitute a bundle and has delivered the bundle, and means for intermittently driving the conveyor so that the conveyor is stationary when a bundle is delivered thereto.

12. In mechanism for use in delivering the products of a printing machine in bundles consisting of a predetermined number of products, the combination of a delivery fly, two delivery devices coactable with the said fly, an endless conveyor to which the devices are arranged to deliver products, means causing the devices to move in the same looped path but out of phase with respect to each other, one device being moved on one side of the path and towards the conveyor as products passing in succession from the fly are received by the device while the other device is returned from the conveyor and on the other side of the path towards a position for receiving products from the fly, each device receiving products until the number required to constitute a bundle has been received whereupon the other device is moved into receiving position, and means for intermittently driving the conveyor so that the conveyor is stationary when a bundle is delivered thereto.

13. In mechanism for use in delivering the products of a printing machine in bundles consisting of a predetermined number of products, the combination of a pair of delivery devices each comprising a receptacle, an arm carrying the receptacle, a second arm to which the first arm is articulated, a third arm for rocking the first arm about the second arm, the pivotal points of the second arms of the two devices lying on co-axial axes, and cam means for rocking the second and third arms, an endless conveyor to which the devices are arranged to deliver products, the cams being such that the second and third arms of one device are operated together equally to enable the corresponding receptacle to receive copies and to move progressively towards the conveyor while the second and third arms of the other device are caused to have relative movement in such manner that the corresponding receptacle is moved clear of the first receptacle and returned from the conveyor whereupon these arms are caused to return to their original position to move the second receptacle into position in readiness to receive products to constitute a succeeding bundle and means for intermittently driving the conveyor so that the conveyor is stationary when a bundle is delivered thereto.

14. In mechanism for use in delivering the products of a printing machine in bundles consisting of a predetermined number of products, the combination of a delivery fly, two delivery devices coactable with the said fly, an endless conveyor to which the devices are arranged to deliver products, means for so operating the devices that one device is moved slowly from a receiving point towards the conveyor as the device receives products passing in succession from the fly while the other device is returned from the conveyor and presented to receive products from the fly at the moment when the first device has received the required number to constitute a bundle and has delivered the bundle, and means for intermittently driving the conveyor so that the conveyor is stationary when a bundle is delivered thereto the means including a gear wheel driven at a constant speed, a gear wheel in drive connection with the conveyor, an intermediate gear device in mesh with the second gear wheel and mounted to rock on the first gear wheel, and a cam device for imparting a cyclic rocking movement to the gear device.

15. In mechanism for use in delivering the products of a printing machine in bundles consisting of a predetermined number of products, the combination of a delivery fly, two delivery devices, an endless conveyor to which the devices are arranged to deliver products from the said fly, means causing the devices to move in the same looped path but out of phase with respect to each other, one device being moved on one side of the path and towards the conveyor as products passing in succession from the fly are received by the device while the other device is returned from the conveyor and on the other side of the path towards a position for receiving products from the fly, each device receiving products from the fly until the number required to constitute a bundle has been received whereupon the other device is moved into receiving position relatively to the fly, and means for intermittently driving the conveyor so that the conveyor is stationary when a bundle is delivered thereto, said last mentioned means including a gear wheel driven at a constant speed, a gear wheel in drive connection with the conveyor, an intermediate gear device in mesh with the second gear wheel and mounted to rock on the first gear wheel, and a cam device for imparting a cyclic rocking movement to the gear device.

16. In mechanism for use in delivering the products of a printing machine in bundles consisting of a predetermined number of products, the combination of a pair of delivery devices each comprising a receptacle, an arm carrying the receptacle, a second arm to which the first arm is articulated, a third arm for rocking the first arm about the second arm, the pivotal points of the second arms of the two devices lying on co-axial axes, and cam means for rocking the second and third arms, an endless conveyor to which the devices are arranged to deliver products, the cams being such that the second and third arms of one device are operated together equally to enable the corresponding receptacle to receive copies and to move progressively towards the conveyor while the second and third arms of the other device are caused to have relative movement in such manner that the corresponding receptacle is moved clear of the first receptacle and returned from the conveyor whereupon these arms are caused to return to their original position to move the second receptacle into position in readiness to receive products to constitute a succeeding bundle and means for intermittently driving the conveyor so that the conveyor is stationary when a bundle is delivered thereto, the means including a gear wheel driven at a constant speed, a gear wheel in drive connection with the conveyor, an intermediate gear device in mesh with the second gear wheel and mounted to rock on the first gear wheel, and a cam device for imparting a cyclic rocking movement to the gear device.

17. In a delivery for a printing machine, a fly, a conveyor, and a plurality of receptacles each adapted in succession to receive a predetermined number of products from the fly and deposit the said products on the conveyor.

18. In a device of the character described, the combination with a delivery fly, of a receptacle, said receptacle being movable to a position within the periphery of the fly and inoperative to receive products therefrom, and then movable to a position exterior of the said periphery to receive products therefrom.

19. In a device of the character described, the combination with a delivery fly, of a pair of receptacles, one of said receptacles being movable to a position within the periphery of the said fly and inoperative to receive products therefrom, the other of said receptacles being then positioned without the exterior of the said periphery and operative to receive products therefrom, and means for interchanging the positions of the said receptacles so that same may alternately be made operative and inoperative to receive products.

20. In a device of the character described, the combination of a delivery fly, a plurality of receptacles alternately movable into and without the periphery of said fly so that while one receptacle is positioned within the periphery of the fly and inoperative to receive products therefrom, another receptacle will be positioned without the said periphery to receive products, and means effective for sequentially interchanging the positions of the receptacles so that as one receptacle is moved to an operative position, another will be moved to an inoperative position.

21. In a device of the character described, the combination of a delivery fly, a pair of receptacles arranged to coact with the fly and movable relatively thereto, means for actuating each of said receptacles so that same may individually and sequentially receive a predetermined number of products from the fly, and other means for conveying the said predetermined number of products from each of the receptacles in turn as a separate bundle.

22. In a device of the character described, the combination of a delivery fly, a pair of receptacles movable relatively to the fly and adapted to individually receive products therefrom, rotatable means for swinging said receptacles into and out of position to receive products from the fly, other means for conveying products from each of the said receptacles in turn, and instrumentalities including a fixed cam and movable cams for operating the said receptacles, whereby when one of the receptacles has ceased to receive products from the fly, the other receptacle will be located in a position effective for replacing the first mentioned receptacle to receive products from the fly.

CECIL GEORGE QUICK.
DONALD ARTHUR BALL.
WILLIAM ARNOLD WHITEHEAD.